United States Patent [19]
Gaddis et al.

[11] Patent Number: 5,636,449
[45] Date of Patent: Jun. 10, 1997

[54] WATER REMOVAL FROM SOLID PRODUCTS AND APPARATUS THEREFOR

[75] Inventors: Stephen T. Gaddis; Thomas B. Barker, both of Green River, Wyo.

[73] Assignee: General Chemical Corporation, Parsippany, N.J.

[21] Appl. No.: 548,658

[22] Filed: Oct. 26, 1995

[51] Int. Cl.⁶ .................................................. D06F 58/00
[52] U.S. Cl. .............................. 34/124; 34/477; 34/515
[58] Field of Search ........................... 34/124, 125, 77, 34/83, 477, 514, 515

[56] References Cited

U.S. PATENT DOCUMENTS 4,222,178  9/1980  Moran .............................. 34/41
5,020,243  6/1991  Miller et al. ...................... 34/119

Primary Examiner—Henry A. Bennett
Assistant Examiner—Dinnatia Doster
Attorney, Agent, or Firm—Arthur J. Plantamura

[57] ABSTRACT

A tube dryer system is used to remove moisture from solid commercial products. The present apparatus includes a condensate vessel that separates condensed steam from excess steam. The excess steam is passed through a thermocompressor and combined with incoming fresh steam to produce a combined steam feed stream having a higher flow rate at only slightly reduced pressure and reduced superheat content, resulting in increased dryer capacity and reduced steam losses with no increase in energy costs.

8 Claims, 2 Drawing Sheets

WATER REMOVAL FROM SOLID PRODUCTS AND APPARATUS THEREFOR

This invention relates to improved water removal from solid products using steam tube dryers. More particularly, this invention relates to a process that reduces steam consumption and increases drying capacity, and apparatus therefor.

BACKGROUND OF THE INVENTION

Steam tube dryers are used to remove both molecularly bound and free moisture from solid industrial products such as soda ash. Soda ash is received as a wet monohydrate cake and must be dried to an anhydrous dry powder. This is an important step in manufacture, since if the product is incompletely dried it will not meet specifications and it will lump or cake, making transfer difficult or even impossible.

A steam tube dryer passes steam into a plurality of tubes in the dryer containing the solid material to be dried. The steam never contacts the product directly; instead the steam heats the tubes and the product contacts the tubes. The steam heats the tubes to a high enough temperature to remove water from the solids. The capacity of the dryer is limited by the temperature difference across the tube walls, the area of the tubes, and the heat transfer coefficient. The heat transfer coefficient is strongly related to the shape of the condensing water film on the steam side of the tubes, and the depth of condensate within the tubes. Condensate within the tubes effectively reduces the amount of tube surface area available for heat transfer. In order to sweep the condensate out of the tubes, excess steam is fed to the dryer to increase condensate removal. This steam is termed excess steam because it is not condensed (its heat value is not used), it simply sweeps water out of the tubes.

Thus steam is fed under high pressure to the dryers through a plurality of tubes. Excess steam is used to increase the capacity of the dryer. Moisture is evaporated from the product and vented to the atmosphere. Excess steam is also vented to the atmosphere. The excess steam results in increased costs of the system due to the high cost of generating steam. Steam traps have been used in the past to recover the condensate leaving the dryer. Steam traps allow water to pass but prohibit the passage of steam. Since the purpose of the excess steam is to sweep through the dryer without condensing, the steam traps had to be bypassed to maintain production rates. The excess steam is now at a lower pressure and temperature than the feed steam to the dryer and it cannot be re-used. Excess steam is at a pressure about 5 psig lower than the incoming fresh steam.

A typical prior art dryer system 10 is shown in FIG. 1. A wet cake product is transferred to a steam tube dryer 12 through a line 13. Steam is passed at a rate of about 30,000 lb/hr via a pipe 14 at 400 psig (600°F) to the steam tube dryer 12. The product moisture is drawn from the dryer 12 via a pipe 15. A steam trap 16 is connected to the dryer 12 and draws off the condensate through a pipe 17. The excess steam is vented to the atmosphere through a vent 18. For each such steam tube dryer 12 in a drying system, about 3,200 lb/hr of steam is lost through the excess steam vent 18. The dried product is removed from the dryer 12 via a pipe 19.

Complete moisture removal from a wet product is essential to meet specifications and prevent handling problems. Thus, a large flow of high pressure, high temperature steam is required to feed these tube dryers. It might be thought that steam costs can be reduced by reducing the amount of excess steam used during drying by reducing the steam flow rate and thus use more of the latent heat in the steam, producing less excess steam and more condensate. However, we have found that this reduces the production drying rate and bottlenecks plant capacity. If no excess steam is used, we have found that it ultimately becomes impossible to produce dry product. An excess of about 15% of steam is required for efficient moisture removal from the product.

What would be highly desirable is to be able to increase the capacity of the steam tube dryers and simultaneously eliminate the loss of the excess steam without increasing energy costs.

SUMMARY OF THE INVENTION

We have found that the capacity of steam tube dryers can be increased, and energy usage reduced, by re-compressing the excess steam and recycling it to the fresh steam feed stream. The combined feed stream thus produced provides a faster steam flow rate, thereby improving the heat transfer rate and increasing the capacity of the dryers, with a favorable decrease in super-heat and a slight pressure decrease of the steam feed. The result is high efficiency moisture removal with a substantial decrease in energy costs, and elimination of the venting of steam to the atmosphere.

The present process offers several advantages beyond the elimination of excess steam. It is highly advantageous to have the feed steam be close to saturation in order to have the most effective heat transfer coefficient. Since the fresh steam originates as turbine feed steam, it is substantially superheated. Removal of this superheat was accomplished heretofore with expensive and unreliable mechanical desuper-heater equipment. The new process includes a simple and very reliable de-superheater, such as a thermocompressor, which eliminates the need for other de-superheater equipment. An additional advantage is the ease of operation. In the prior process, operators were forced to estimate how much excess steam was required. The present process is automated and self regulating. Yet another advantage of the present process is that not only excess steam but some of the condensate is recycled. Some of the condensate leaving the dryer is flashed to steam and re-used.

The apparatus of the invention, in addition to conventional steam tube dryers, includes tanks for receiving the condensate and excess steam from the dryers. The condensate is recovered through conventional methods. The excess steam and a small amount of flashed condensate is recycled by passing through a thermocompressor that mixes the recycle steam with fresh incoming steam to produce a higher flow rate of steam having only a slightly reduced temperature and pressure. A small side-stream of recycle steam is removed to a low pressure recovery system to prevent build-up of non-condensable (heat transfer inhibiting) gases such as air or carbon dioxide.

DETAILED DESCRIPTION OF THE INVENTION

Figure 1:
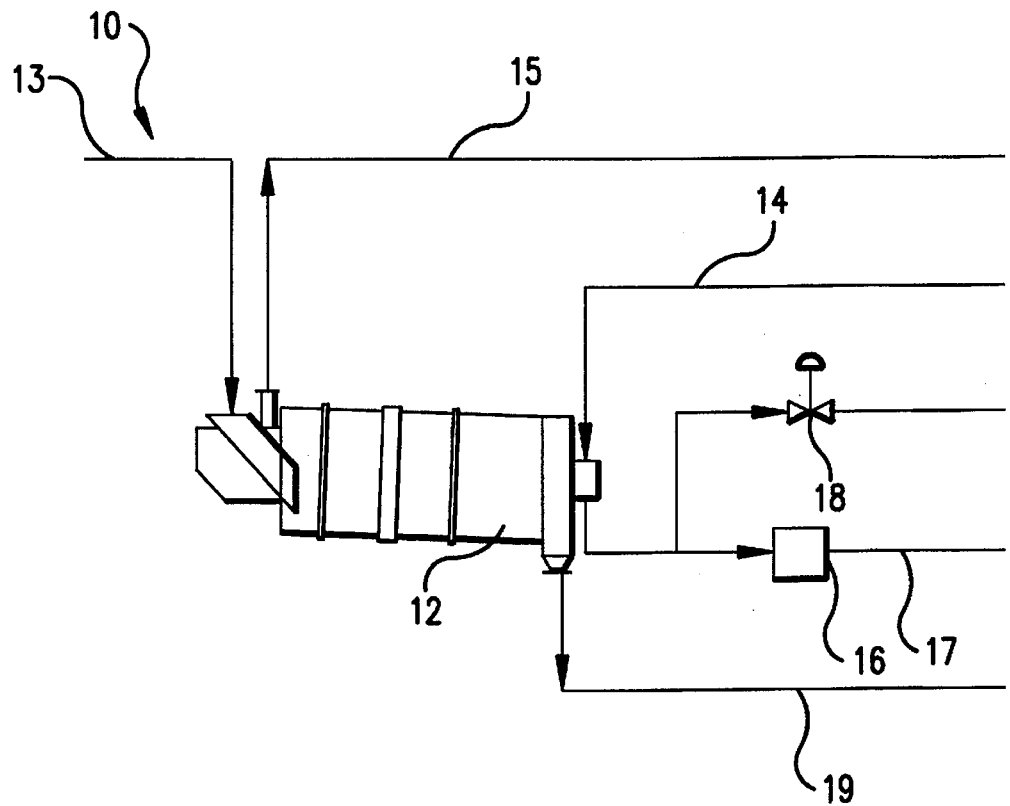
FIG. 1 is a schematic view of a prior art steam tube dryer that vents excess steam to the atmosphere.

The present invention can be described by reference to FIG. 2. Although only a single dryer is shown in the drawing, it will be understood that an array of dryers is generally used.

Figure 3:
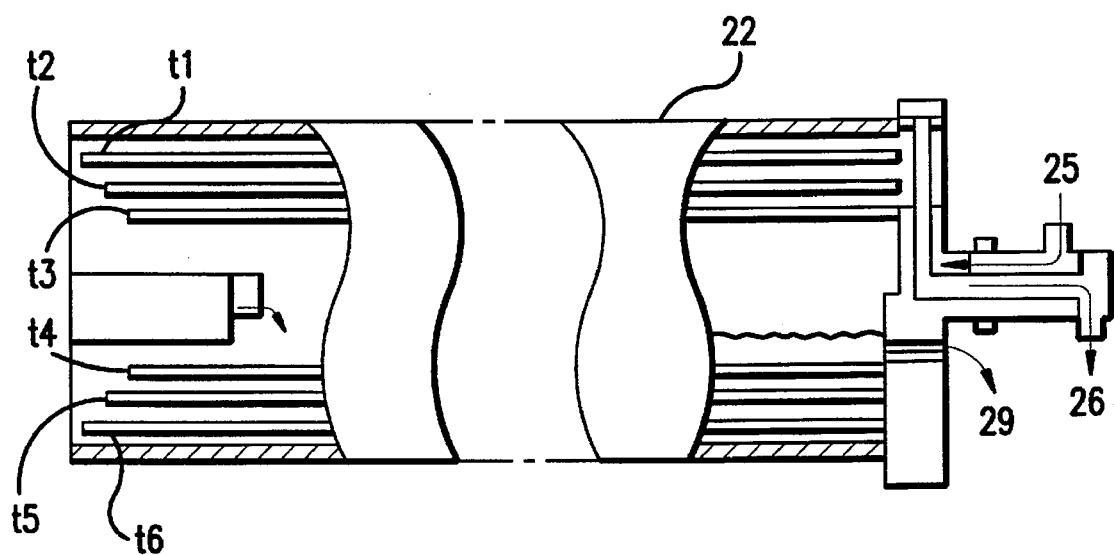
FIG. 3 is a fragmentary view illustrating in more detail a plurality of tubes which receive the drying steam.

Feed steam at a pressure of about 415 psig is fed via a line 20 to the motive inlet of a subcritical thermocompressor, i.e., a thermocompressor with less than supersonic velocity, 24. The recycle steam line 30 feeds into the thermocompressor 24 suction inlet. Fresh steam and recycle steam in line 30 are admixed in the thermocompressor 24. The combined steam is passed from the discharge outlet of the thermocompressor 24 via a line 25 to heat the tubes, six only t-1 through t-6 of which are shown, in the steam tube dryer 22, where it removes moisture from the product in the dryer 22. The combined water/steam leaving the dryer 22 is fed via line 26 to a condensate vessel 27. This vessel 27 separates the liquid condensate from the recycle steam and allows some of the condensate to vaporize due to temperature and pressure saturation equilibrium. The recycle steam collects above the liquid in the vessel 27. The recycle steam is passed via (FIG. 3) line 30 into the thermocompressor 24 suction inlet.

The condensate is drawn off from the condensate vessel 27 through a line 28 and is collected. The dried product is withdrawn from the steam tube dryer 22 by means of a line 29.

A small portion, e.g., about 5%, of the steam in the line 30 is vented to a low pressure steam system via a pipe 32 to permit continuous venting of non-condensable gases from the system. This prevents a build-up of these non-condensable gases in the steam feed stream that would result in lowering of the heat transfer.

The thermocompressor 24 can be a jet-type subcritical thermocompressor that uses the pressure and energy of the incoming steam feed stream in line 30 to re-compress the recycle steam, feeding the combined feed steam and recycle steam to the steam tube dryer 22. In order to be self-regulating, the thermocompressor 24 must be sub-critical. The combined steam feed in line 25 is at a slightly lower pressure than the fresh incoming steam feed in line 20, but it has a much greater flow rate and is closer to saturation by virtue of its reduced temperature caused by admixing fresh steam with saturated recycle steam. The increase in flow rate, the reduction in superheat, and the elimination of lost excess steam result both in increased dryer capacity and in reduced energy consumption.

The condensate receiver vessel 27 can be a vertical or horizontal vessel that can withstand the pressures generated in the system. It separates the condensate from the excess steam. This vessel must maintain a certain liquid level for condensate removal, and it must have an appropriate geometry to allow separation of the steam and condensate so that the excess steam can collect above the liquid level for withdrawal to the thermocompressor 24.

The addition of the recycle steam to the fresh steam stream results in an increased velocity of steam through the dryer 22, which aids in drying the product by virtue of improving the heat transfer rate and reducing super-heat. Energy costs are reduced by eliminating the loss of excess steam, the recycling of a small amount of condensate, and the elimination of de-superheating equipment. No energy other than the existing incoming steam is required for the thermocompressor 24. The use of a thermocompressor 24 ensures that the improved steam feed process is self regulating. The higher the feed steam pressure, the higher the rate of recycled steam that can be used, further improving dryer performance.

The invention will be further described in the following Example, but the invention is not meant to be limited to the details described therein.

EXAMPLE

Figure 2:
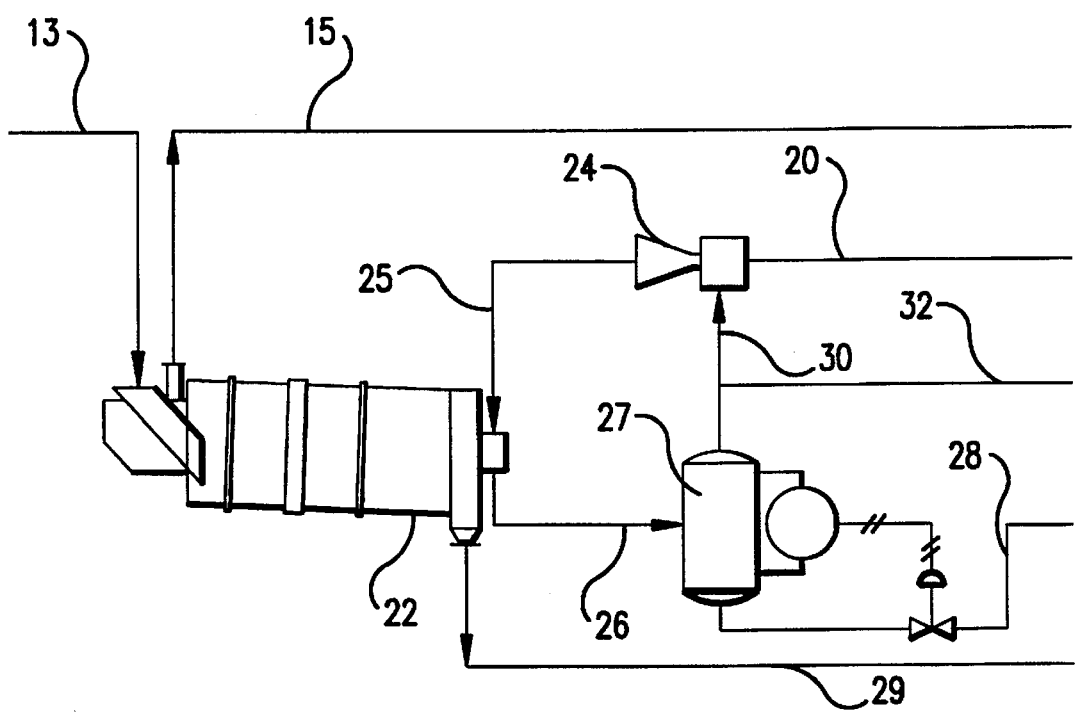
FIG. 2 is a schematic view of a steam tube dryer of the present invention that reuses excess steam.

In a system as shown in FIG. 2; wet soda ash cake was charged to a steam tube dryer 22. About 25,000 lb/hr of steam at 410–425 psig (600° F.) was passed through the feed line 20 through a thermocompressor 24 that added about 7000 lb/hr of recycle steam at a pressure of 390–405 psig (about 440° F.). The combined steam feed stream in line 25 contained about 31,000 lb/hr of steam at 405 psig (562° F.). Thus the steam consumption was reduced by 19%, and an increased dryer capacity of about 5% with a substantial decrease in energy costs.

About 1000 lb/hr of recycle steam was continuously vented to a 200 psig steam system through a line 32 to withdraw non-condensable gases from the system.

Drying of the soda ash cake was efficient and produced a dried product having a uniform moisture content at lower costs that the prior art process.

The present apparatus permits tube dryers to operate at high production rates without any loss of steam to the atmosphere, and eliminates the use of de-superheating equipment. The increased production rates are obtained with reduced energy consumption, resulting in a low cost drying process. The initial somewhat higher capital costs of the present equipment is rapidly made up for in the increased capacity of the dryers, resulting in a net decrease in overall drying costs.

Although the present invention has been described in terms of particular configurations and equipment, equivalent means can be substituted to attain the objectives of the present invention as will be apparent to one skilled in the art, and are meant to be included herein. The invention is only meant to be limited by the claims attached hereto.

We claim:

1. Drying apparatus comprising:
    a) a steam tube dryer comprising a plurality of tubes;
    b) a source of superheated feed steam connected to the dryer;
    c) means for de-superheating the feed steam and for introducing excess steam to the tubes;
    d) a condensate vessel for separating excess steam and condensate moisture from the dryer;
    e) a means of withdrawing excess steam from the condensate vessel; and
    f) means for compressing the excess steam withdrawn from the condensate vessel and adding it back to the superheated feed steam thereby reducing the quantity of feed steam required.

2. Apparatus according to claim 1 wherein an array of the dryers of claim 1 are connected together.

3. Apparatus according to claim 1 wherein a vent steam line is connected to the excess steam line to withdraw a portion of said excess steam from the apparatus.

4. A method of drying a wet solid product comprising
    a) charging said wet solid product to one or more steam tube dryers comprising a plurality of tubes;
    b) connecting a source of feed steam to said steam tube dryers;
    c) introducing excess steam above that needed for drying to sweep condensate from the dryer tubes;
    d) withdrawing a combined condensate and excess steam from said dryer to a condensate vessel;
    e) recycling the excess steam withdrawn from the condensate vessel to a thermocompressor and
    f) adding the compressed steam from step e) to said feed steam thereby reducing the quantity of feed steam required.

5. A method according to claim 4 wherein a portion of said excess steam is withdrawn to a low pressure system.

6. A method according to claim 4 wherein a level of condensate in said condensate vessel is maintained so that excess steam can be collected above said condensate level from said vessel.

7. The drying apparatus according to claim 1 wherein a thermocompressor draws and recompresses excess steam from the dryer and reintroduces it to the superheated feed steam.

8. A method according to claim 4 wherein the wet solid product is wet soda ash cake.

* * * * *